(12) United States Patent
Weller et al.

(10) Patent No.: US 12,741,534 B2
(45) Date of Patent: Sep. 22, 2026

(54) VISOR DISPLAY ASSEMBLY WITH VARIABLE TRANSMITTANCE

(71) Applicant: Gentex Corporation, Zeeland, MI (US)

(72) Inventors: Andrew D. Weller, Holland, MI (US); Bradley A. Bosma, Hudsonville, MI (US); Michael J. Burns, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 261 days.

(21) Appl. No.: 18/411,238

(22) Filed: Jan. 12, 2024

(65) Prior Publication Data

US 2024/0246415 A1 Jul. 25, 2024

Related U.S. Application Data

(60) Provisional application No. 63/439,935, filed on Jan. 19, 2023.

(51) Int. Cl.

| | |
|---|---|
| ***B60K 35/22*** | (2024.01) |
| ***B60J 3/02*** | (2006.01) |
| ***B60K 35/28*** | (2024.01) |
| ***G06V 20/59*** | (2022.01) |

(52) U.S. Cl.

CPC ............. *B60K 35/22* (2024.01); *B60J 3/0204* (2013.01); *B60K 35/28* (2024.01); *G06V 20/59* (2022.01); *B60K 2360/176* (2024.01); *B60K 2360/349* (2024.01); *B60K 2360/777* (2024.01)

(58) Field of Classification Search

CPC .. B60K 35/22; B60K 35/28; B60K 2360/777; B60K 2360/176; B60K 2360/349; G06V 20/59; B60J 3/0204

See application file for complete search history.

(56) References Cited

U.S. PATENT DOCUMENTS

| | | | |
|---|---|---|---|
| 5,928,572 | A | 7/1999 | Tonar et al. |
| 5,998,617 | A | 12/1999 | Srinivasa et al. |
| 6,020,987 | A | 2/2000 | Baumann et al. |

(Continued)

FOREIGN PATENT DOCUMENTS

| | | | | |
|---|---|---|---|---|
| DE | 102019211516 A1 * | 2/2021 | | ............ B60K 35/50 |
| JP | 2018177054 A | 11/2018 | | |

(Continued)

*Primary Examiner* — Justin S Lee

(74) *Attorney, Agent, or Firm* — Price Heneveld LLP; Brian James Brewer

(57) ABSTRACT

A display assembly for a vehicle is disclosed. The display assembly may include a variable transmittance panel in connection with a support structure connecting the display assembly to the vehicle. The variable transmittance panel may include an electro-optic element configured to vary in transmittance in response to a transmittance control signal and a display that is at least partially light transmissive. The display may include opposing display surfaces on a first side and a second side. The first side is disposed adjacent to the electro-optic element. In operation, the display may output display content as display light from both the first side and the second side. The visibility of the display light output from the first side may be controlled or adjusted by the transmittance of the electro-optic element.

18 Claims, 5 Drawing Sheets

(56) References Cited

U.S. PATENT DOCUMENTS

| | | | | |
|---|---|---|---|---|
| 6,037,471 | A | 3/2000 | Srinivasa et al. | |
| 6,137,620 | A | 10/2000 | Guarr et al. | |
| 6,141,137 | A | 10/2000 | Byker et al. | |
| 6,193,912 | B1 | 2/2001 | Thieste et al. | |
| 6,241,916 | B1 | 6/2001 | Claussen et al. | |
| 6,249,369 | B1 | 6/2001 | Theiste et al. | |
| 6,519,072 | B2 | 2/2003 | Nishikitani et al. | |
| 11,048,105 | B1 * | 6/2021 | Roy | G02F 1/0121 |
| 2006/0191177 | A1 | 8/2006 | Engel | |
| 2011/0267279 | A1 * | 11/2011 | Alvarez Rivera | H10K 59/50 445/24 |
| 2013/0162924 | A1 * | 6/2013 | Sahouani | G02F 1/1323 349/123 |
| 2017/0013188 | A1 * | 1/2017 | Kothari | B60R 11/0235 |
| 2017/0080782 | A1 * | 3/2017 | Spencer | B60J 3/04 |
| 2017/0313248 | A1 * | 11/2017 | Kothari | H04N 23/67 |
| 2019/0100082 | A1 * | 4/2019 | Li | G02B 27/01 |
| 2019/0389282 | A1 * | 12/2019 | Wang | B60K 35/28 |
| 2020/0361292 | A1 * | 11/2020 | Kishimoto | G02F 1/13306 |
| 2022/0269892 | A1 * | 8/2022 | Huang | G06V 20/56 |
| 2022/0402339 | A1 * | 12/2022 | Todd | B60J 3/0208 |
| 2023/0226972 | A1 * | 7/2023 | Burger | B60K 35/654 315/159 |

FOREIGN PATENT DOCUMENTS

| | | | | |
|---|---|---|---|---|
| JP | 2021109596 A | 8/2021 | | |
| KR | 20200134829 A | 12/2020 | | |
| WO | 9842796 A1 | 10/1998 | | |
| WO | 9902621 A1 | 1/1999 | | |
| WO | WO-2014098911 A1 * | 6/2014 | | B60J 3/0291 |

* cited by examiner 20, 20a
54
52
24
22
60, 62
12, 48
30
36
32
10
24a
56
24b 20, 20b
54
52
24
22
60, 62
30
12, 48
30
36
32
10
32
24a
56
24b 20, 20c
54
22
60, 62
24
12, 48
30
10
36
24b
24a
56

20, 20d
54
22
60, 62
24
12, 48
30
30
36
24b
10
24a
56

VISOR DISPLAY ASSEMBLY WITH VARIABLE TRANSMITTANCE

CROSS-REFERENCE TO RELATED APPLICATIONS

This application claims priority under 35 U.S.C. § 119(e) and the benefit of U.S. Provisional Application No. 63/439,935 entitled VISOR DISPLAY ASSEMBLY WITH VARIABLE TRANSMITTANCE, filed on Jan. 19, 2023, by Andrew D. Weller et al., the entire disclosure of which is incorporated herein by reference.

TECHNOLOGICAL FIELD

The present invention generally relates to a display assembly, and more particularly, to a visor, sunshade, or privacy panel for a vehicle with a display that provides for variable transmittance of light through therethrough.

SUMMARY OF THE DISCLOSURE

According to one aspect of the present disclosure, a display assembly for a vehicle is disclosed. The display assembly may include a variable transmittance panel in connection with a support structure connecting the display assembly to the vehicle. The variable transmittance panel may include an electro-optic element configured to vary in transmittance in response to a transmittance control signal and a display that is at least partially light transmissive. The display may include opposing display surfaces on a first side and a second side. The first side is disposed adjacent to the electro-optic element. In operation, the display may output display content as display light from both the first side and the second side. The visibility of the display light output from the first side may be controlled or adjusted by the transmittance of the electro-optic element.

The display assembly may further include at least one controller configured to adjust the variable transmittance panel to a plurality of states. A controller may adjust the panel to a first state where a transmittance of the electro-optic element is controlled to a darkened or opaque state or condition. In this configuration, display light from the display device is output from the first side of the display into the vehicle and is blocked from transmission from the second side by the electro-optic element. In a second state, the controller may adjust the transmittance of the electro-optic element to a transmissive state. In the transmissive state, the display light is output from the first side and the second side of the display. In this configuration, the light output from the second side of the display may be transmitted through the electro-optic element and through the windshield of a vehicle.

According to another aspect of the disclosure, a method is disclosed for controlling a variable transmittance panel comprising a display that is at least partially light transmissive and disposed proximate to an exterior window of a vehicle. The method includes controlling the variable transmittance panel in a first state by controlling the display to emit display light from a first side and a second side and controlling an electro-optic element to a darkened or opaque state. The method further includes controlling the variable transmittance panel in a second state by controlling the display to emit display light from a first side and a second side and controlling an electro-optic element to a light transmissive state. The light transmissive state outputs the display light from the first side through an exterior window of the vehicle and from the second side into a passenger compartment of the vehicle.

According to yet another aspect of the disclosure, a display assembly for a vehicle is disclosed and includes a variable transmittance panel in connection with a support structure connecting the display assembly to the vehicle. The variable transmittance panel comprises an electro-optic element configured to vary in transmittance in response to a transmittance control signal and a display that is at least partially light-transmissive. The display is configured to output a display light from a first side and an opposing second side. At least one controller is configured to adjust the variable transmittance panel to a plurality of states comprising a first state and a second state. In the first state, the a least one controller controls a transmittance of the electro-optic element to a darkened or opaque state and in the darkened or opaque state, the display light from the display is output from the second side and blocked from transmission through the electro-optic element on the first side. In the second state, the at least one controller controls the transmittance of the electro-optic element to a transmissive state and the display light is output from the first side and the second side. In this configuration, the display light is transmitted into a passenger compartment of the vehicle, and the display light is transmitted from the second side through an exterior window of the vehicle.

These and other features, advantages, and objects of the present invention will be further understood and appreciated by those skilled in the art by reference to the following specification, claims, and appended drawings.

DETAILED DESCRIPTION

For purposes of description herein, the terms “upper,” “lower,” “right,” “left,” “rear,” “front,” “vertical,” “horizontal,” and derivatives thereof shall relate to the invention as oriented in FIG. 2. Unless stated otherwise, the term “front” shall refer to the surface of the element closer to an intended viewer of the display, and the term “rear” shall refer to the surface of the element further from the intended viewer of the display. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The terms "substantially," "about," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially," "about," etc. may denote values within about 10% of each other, such as within about 5% of each other, or within about 2% of each other.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

Figure 1:
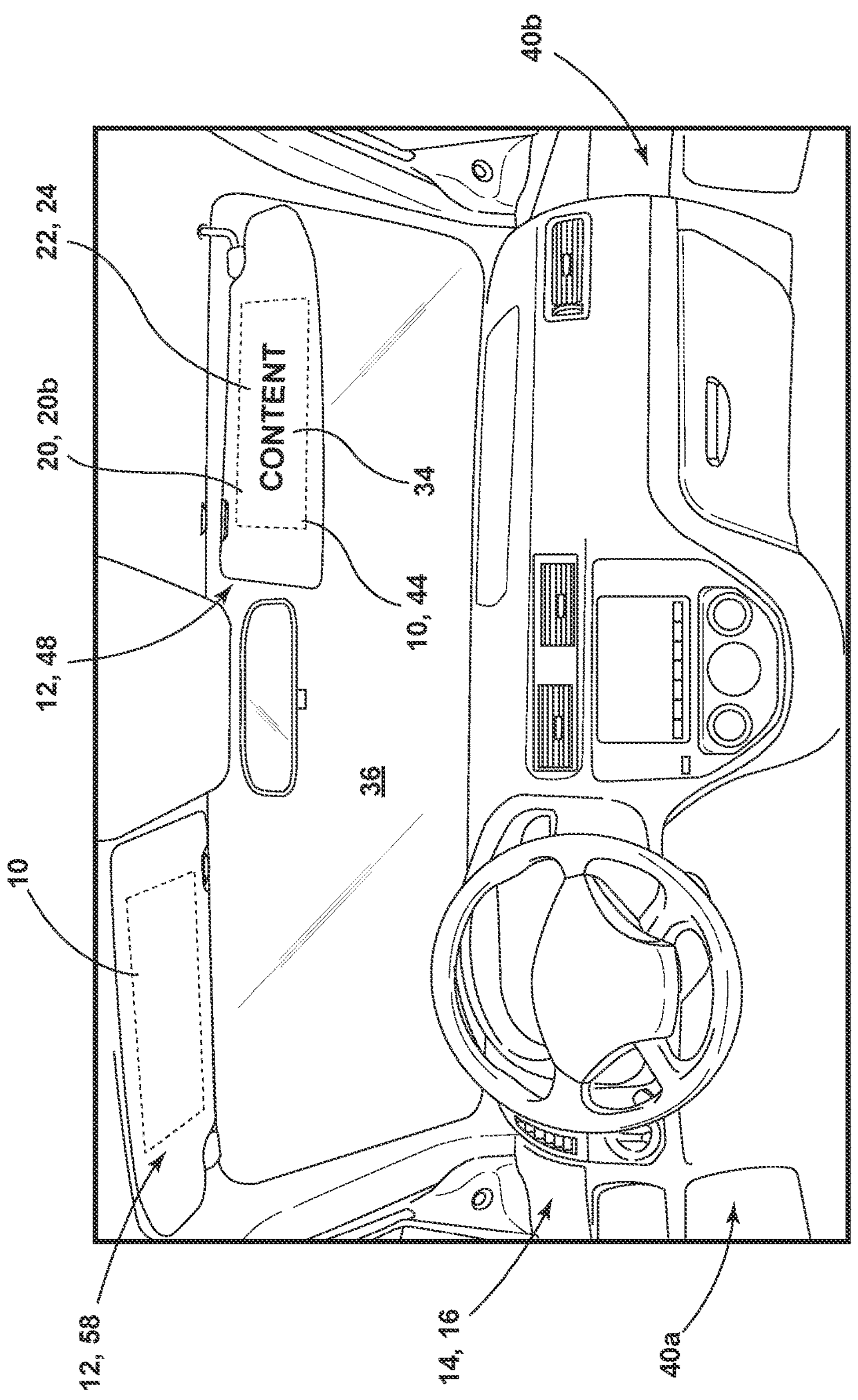
FIG. 1 is a projected view demonstrating a passenger compartment of a vehicle including a display assembly comprising a variable transmittance panel.
Figures 2A, 2B, 2C, 2D:
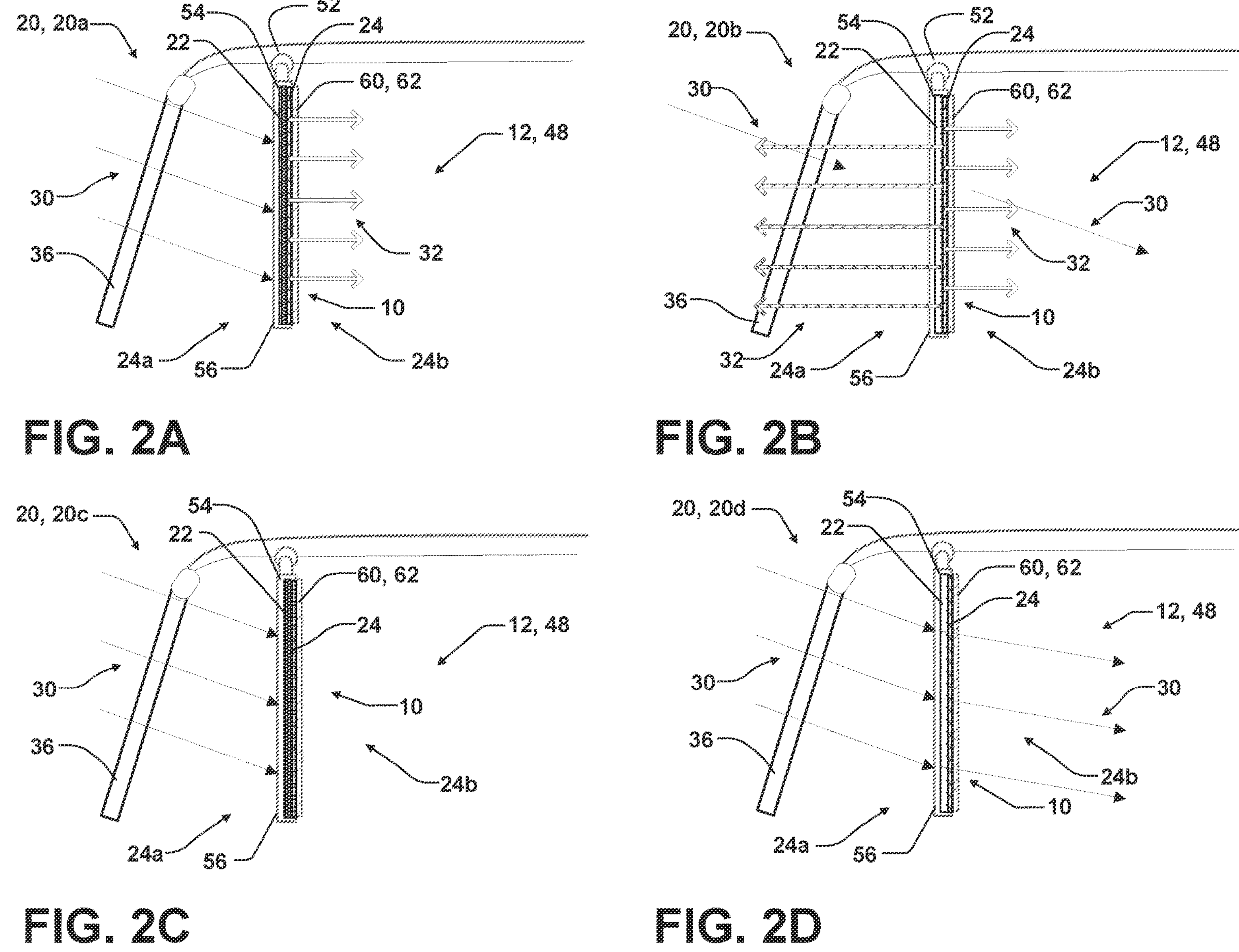
FIG. 2A is a side view of the variable transmittance display panel in a first state.
FIG. 2B is a side view of the variable transmittance display panel in a second state.
FIG. 2C is a side view of the variable transmittance display panel in a third state.
FIG. 2D is a side view of the variable transmittance display panel in a fourth state.

Referring to FIGS. 1 and 2, a variable transmittance display panel 10 is demonstrated in connection with a display assembly 12 that may correspond to a visor, privacy panel, sunshade, or similar assembly disposed in a passenger compartment 14 of a vehicle 16. As later discussed in detail in reference to FIGS. 2A-2D, the variable transmittance display panel 10, hereinafter the display panel 10, may be controlled to a plurality of states 20. The plurality of states 20 may be controlled to adjust both a transmittance of an electro-optic element 22 as well as a display state of an at least partially transparent display 24. In the various states 20, the display panel 10 may be configured to adjust the transmittance of environmental light 30 through the display assembly 12 as well as the transmittance of display light 32 output from the display 24. In this way, the display panel 10 may facilitate the selective transmission of the environmental light 30 to limit glare light entering the passenger compartment 14, as well as control the viewing area associated with the display light 32 and corresponding display content 34 output from the display 24 into the passenger compartment 14 as well as outside the vehicle 16 through an exterior window 36, exemplified as a windshield 36 of the vehicle 16.

As demonstrated in FIG. 1, the display content 34 is demonstrated on the display 24 on a passenger side 40*b* of the passenger compartment 14. In some implementations, the display panel 10 may similarly be incorporated in the visor assembly or display assembly 12 on a driver's side 40*a* of the passenger compartment 14 or various other portions of the vehicle 16 that may be associated with the visor assembly, a privacy panel, a sunshade, or similar device. Accordingly, though the display assembly 12 is primarily described in reference to a visor, the assembly may be implemented in a variety of applications positioned proximate to or in connection with exterior windows or transparent exterior panels of the vehicle 16. As described in various forthcoming examples, the variable transmittance display panel 10 may be implemented in a variety of ways to facilitate a variety of comfort features, display operations, and/or image-capture features to improve the operation of the vehicle 16.

Referring now to FIGS. 2A-2D, the plurality of states 20 of the display panel 10 are demonstrated and described in further detail. Before introducing the specific operation of the plurality of states 20, an exemplary structure of a plurality of adjacent layers 44 of the display panel 10 may be introduced for clarity. In the exemplary embodiment shown, the plurality of layers 44 of the display panel 10 may comprise an electro-optic element 22 positioned on a first side 24*a* of the display 24. The first side 24*a* of the display 24 may correspond to an outward facing side of a visor assembly 46 or sunshade directed through an exterior window, for example, the windshield 36, in a deployed state 48. Opposite the first side 24*a*, the second side 24*b* may be directed into the passenger compartment 14 of the vehicle 16 in the deployed state 48. In this configuration, the transmittance of the electro-optic element 22 may be adjusted by a controller 50 to selectively allow the display light 32 to be emitted outward from the first side 24*a* through the electro-optic element 22, such that the display content 34 is visible through the windshield 36 as represented in FIG. 2B. Additionally, as shown in FIG. 2A, the control of the transmittance through the electro-optic element 22 may limit the transmission of the environmental light 30 through the display panel 10 to limit distractions from the display content 34 as well as improve the contrast of the depiction of the display content 34 on the display 24.

Figure 3:
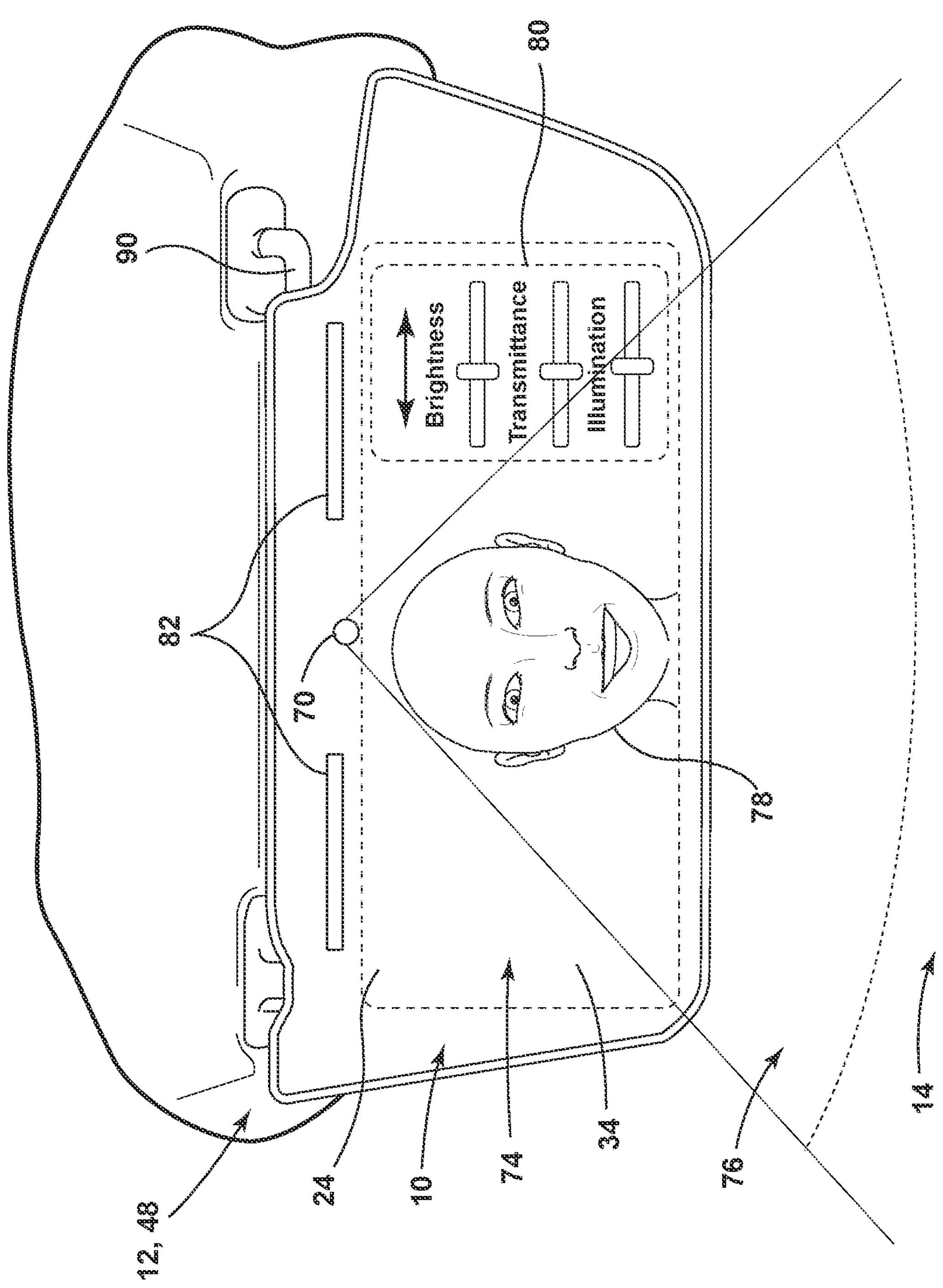
FIG. 3 is a projected view of a variable transmittance display panel incorporated in a visor assembly demonstrating image data captured by a camera of a vehicle.
Figure 4:
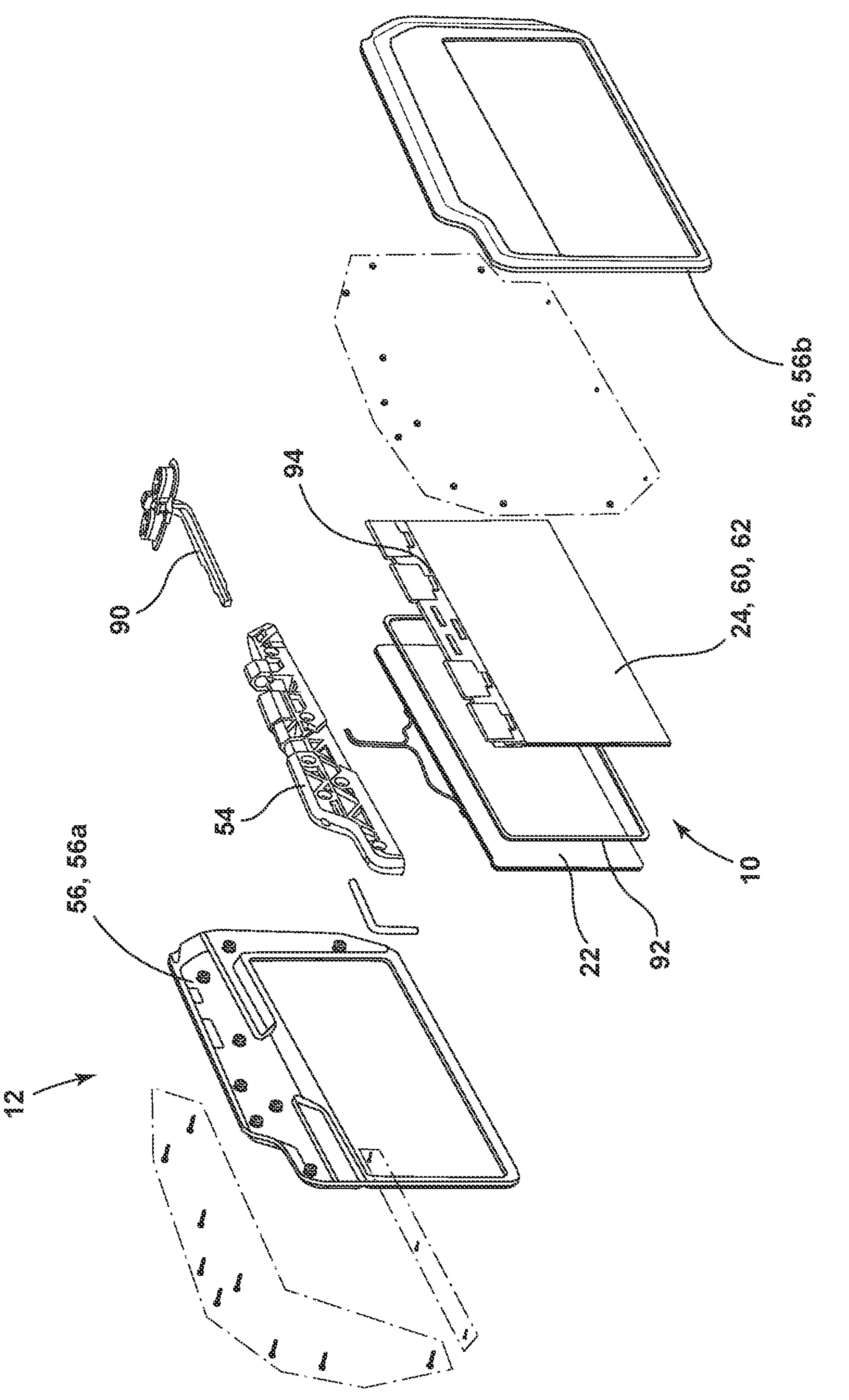
FIG. 4 is an exploded assembly view demonstrating the variable transmittance display panel incorporated in a visor assembly.

As discussed further in reference to FIGS. 3 and 4, the display panel 10 may be incorporated as a portion of or an integral component of a visor assembly 46 and be connected to a header 52 for a portion of the vehicle 16. In this configuration, the display assembly 12 may be incorporated in the vehicle proximate to an exterior window, for example the windshield 36, via a frame 54 and trim assembly 56. In operation, the visor assembly 46 may be selectively positioned from the deployed state 48 to a stowed state 58, depending on the preference of the user. Though the disclosure primarily describes the operation of the display panel 10 in reference to the visor 46 in the deployed state 48, the display may similarly be controlled to demonstrate the display content 34 in the stowed state 58. In the stowed state 58, the display content 34 may be output from the first side 24*a* of the display panel 10 and into the passenger compartment 14 from the ceiling or headliner area of the passenger compartment 14. The resulting operation of the display panel 10 may provide for a video display on the headliner region of the vehicle 16, which may be utilized for various applications and particularly useful for presenting video or other visible content to a passenger of the vehicle that is reclined in a seat. Such operation may, in some cases, be activated by the controller 50 in response to a reclining angle of the seat. Accordingly, the display panel 10 may provide various benefits and operating features.

As previously demonstrated in FIGS. 2A and 2B, the display panel 10 may be selectively controlled to an opaque active state 20*a*, demonstrated in FIG. 2A, and a transmissive active state 20*b*, demonstrated in FIG. 2B. Additionally, the display panel 10 may be controlled to an opaque inactive state 20*c*, demonstrated in FIG. 2C, and a transmissive inactive state 20*d*, demonstrated in FIG. 2D. As shown in FIG. 2C, the opaque inactive state 20*c* may limit the transmission of the environmental light 30 thorough the display panel 10, which may provide for the blockage of glare light entering through the windshield 36 into the passenger compartment 14. As demonstrated in FIG. 2D, the transmissive inactive state 20*d* may be activated by the controller 50 to allow the environmental light 30 to pass through the display panel 10 and into the passenger compartment 14 of the vehicle 16. In this way, the variable transmittance display panel 10 may be adjusted to control the transmission of the environmental light 30 into the passenger compartment 14 as well as selectively output the display light 32 from the second side 24*b* and/or first side 24*a* of the display 24 based on the desired operation.

Though discussed in reference to the specific states 20*a*-20*d*, the plurality of states 20 may include virtually any number of states based on the transmission level of the electro-optic element 22. For example, the electro-optic element 22 may correspond to an electrochromic element that may be operable to vary the transmission of the environmental light 30 through the display panel 10 to virtually any level of light transmission from approximately 0% to 95% or more. The transmission of the light through the display panel 10, or conversely the attenuation, may be limited to a maximum transmission state associated with the native transmittance of the display 24 and the electro-optic element 22, as well as any additional elements forming the plurality of adjacent layers 44. In various implementations, the display 24 may provide a maximum transmission that may be associated with a transparent organic light emitting diode (OLED) display, field sequential edge-lit display, fiber optic edge-lit display panel, or similar technologies that may provide for transmittance levels in excess of 60%, 70%, or 80%. The remaining layers 44 of the display panel 10, including the electro-optic element 22, may be associated with a combined attenuation that may have a cumulative effect of approximately 10% blockage or attenuation of light transmission or less. Accordingly, based on these exemplary devices, the display panel 10 may be operable to provide a maximum transmission in the transmissive states (e.g., 20*b*, 20*c*) of 75% or more. Based on this performance currently available with the exemplary and non-limiting technologies discussed herein, the operation of the display panel may provide for transmission of the environmental light 30 through the visor assembly 46, as well as the clear transmission of the display light 32 and corresponding display content 34 outward through the windshield 36 of the vehicle 16.

In addition to the electro-optic element 22 and the display 24, the plurality of layers 44 forming the display panel 10 may include one or more privacy filter layers 60, touch layers 62 (e.g., user interface layers or capacitive touch layers), and/or additional electro-optic elements 22 positioned on the second side 24*b* of the display 24. For example, in some implementations, the privacy layer 60 may be positioned adjacent to the display 24 on the second side 24*b*. The privacy layer 60 may correspond to a static privacy filter or selectively activated privacy filter (e.g., activated by a liquid crystal) that may selectively limit a viewing angle of the display light 32 output from the display 24. In this way, the privacy layer 60 may prevent the display light 32 from being transmitted into the driver's side 40*a* of the passenger compartment 14, thereby limiting distractions to an operator of the vehicle. As later discussed in reference to FIG. 5, the privacy layer 60 may be selectively activated based on an operating state of the vehicle, such that the display light 32 may be selectively transmitted for viewing on the driver's side 40*a* of the passenger compartment 14.

In some implementations, the display panel 10 may be provided with the touch layer 62, which may correspond to various forms of touch sensitive technologies (e.g., capacitive, resistive, etc.) to provide a user interface to control or interact with the display content 34 or control operation of the display panel 10. For example, the touch layer 62 may provide for one or more user inputs or controls that may allow a user to manually adjust the brightness associated with the display light 32 output from the display 24 and/or the level of transmittance through the electro-optic element 22. The inputs received by the user interface associated with the touch layer 62 may be communicated to the controller 50 to effectuate the controls as discussed herein.

In various implementations, the display panel 10 may further or alternatively include the electro-optic element 22 disposed on the second side 24*b* of the display 24. In such implementations, the transmission of the environmental light 30 and/or the display light 32 may be selectively controlled by the electro-optic element 22 positioned adjacent to the second side 24*b* to limit or control the transmission of the corresponding light into the passenger compartment 14. The operation of the electro-optic element 22 disposed on the second side 24*b* of the display 24 may further limit the display light 32 entering the passenger compartment 14 to prevent distractions to passengers or operators of the vehicle 16.

Referring now to FIG. 3, in some implementations, the controller 50 of the display panel 10 may further be in communication with a camera 70. As demonstrated in FIG. 3, the camera 70 may be incorporated in the trim assembly 56 of the visor assembly 46. However, the camera 70 may alternately be positioned in other portions of the vehicle 16 or additional camera modules may be positioned in various portions of the vehicle 16. For example, the camera 70 may be positioned remotely or away from the visor assembly 46 and proximate to a rear seating area of the passenger compartment 14, such that image data may be captured away from the visor assembly 46 to provide conversation display features. Additionally, the camera 70 may correspond to a reverse camera or various forms of exterior cameras of the vehicle 16, such that corresponding environmental image data may be shown on the display 24. In yet another example, the image data 74 depicted on the display 24 may correspond to video content communicated to the controller 50 via a data communication interface, such as a wireless communication interface, cellular interface, etc. In this configuration, image data 74 captured by the camera 70 may be transmitted from the controller 50, and image data captured in a remote location may be communicated to the controller 50 and output through the display 24 to provide video conferencing capabilities. Examples of video conferencing capabilities commonly understood at the time of filing of the application may correspond to TEAMS, Webex, ZOOM, or similar web conference applications.

In the example shown in FIG. 3, the camera 70 may capture the image data 74 in a field of view 76 proximate to the visor assembly 46. In such cases, the display panel 10 and camera 70 may function to provide a vanity display demonstrating a subject 78 positioned or seated in the passenger compartment 14 of the vehicle. The combined operation of the display panel 10 and the camera 70 may accordingly provide for an alternative to a conventional vanity mirror that may be provided in the vehicle 16 in addition to the various features described herein.

As previously discussed, the touch layer 62 of the display panel 10 may provide for a user interface 80 that may be utilized to control the brightness of the display light 32 and transmittance of the electro-optic element 22, as well as the illumination of one or more supplemental light sources 82 that may be incorporated in the visor assembly 46. In such cases, a user may control the operation of the supplemental light sources 82 as well as the plurality of operating states 20 and intermediate conditions of the electro-optic element 22 and the display 24 to adjust the operation associated with the various features described herein. Accordingly, the display panel 10 may provide for various features and operations to improve the comfort of passengers and operation of the vehicle 16. Additional features and details relating to the operation of the display panel 10 in relation to the display content in operation are further discussed in reference to FIG. 5.

Referring now to FIG. 4, an exploded assembly view of the display assembly 12, exemplified as the visor assembly 46, is shown demonstrating the frame 54 and trim assembly 56 in relation to the plurality of layers 44 forming the display panel 10. As previously discussed, the visor assembly 46 may be connected to the header 52 of the vehicle 16 via the frame 54. As shown in FIG. 4, the frame 54 may connect to the header 52 via an elbow assembly 90. The trim assembly 56 may include first and second mating portions 56*a*, 56*b* that interconnect the plurality of layers 44 forming the display panel 10 to the frame 54. The display 24 is shown connected to the electro-optic element 22 via an adhesive spacer 92 that may ensure the display 24 is firmly affixed to the electro-optic element 22 on the first side 24*a*. As previously discussed, additional layers including the privacy layer 60, the touch layer 62, and additional electro-optic elements 22 or various other elements may be positioned on the second side 24*b* of the display 24. Finally, the driving electronics 94 of the display 24 may be positioned along an edge 96 of the display 24 to facilitate the operation of the transparent display as described herein.

Figure 5:
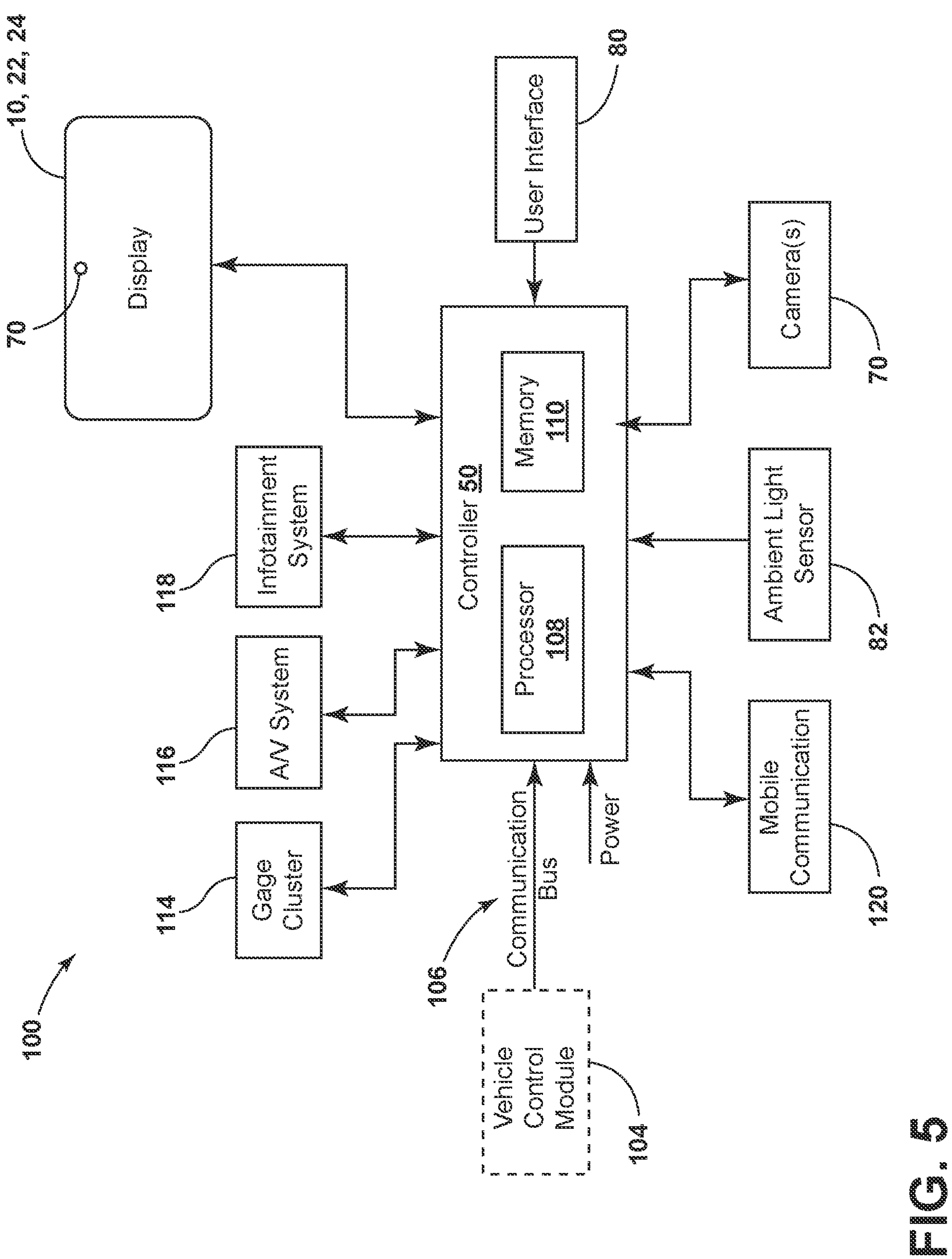
FIG. 5 is a block diagram demonstrating a control system of a vehicle in communication with the variable transmittance display assembly in accordance with the disclosure.

Referring to FIG. 5, a block diagram of a control system 100 incorporating the display panel 10 is shown. The controller 50 is shown in communication with the display panel 10 and may also be in communication with the vehicle control module 104 via a communication bus 106 of the vehicle 16. The communication bus 106 may be configured to deliver signals to the controller 50 identifying various vehicle states. For example, the communication bus 106 may be configured to communicate to the controller 50 a drive selection of the vehicle, an ignition state, a door open or ajar status, and/or a remote activation of the display panel 10. Such information and control signals may be utilized by the controller 50 to activate or adjust various states and/or control schemes of the display panel 10 and/or the visor assembly 46.

As previously discussed, the operation of the display panel 10 may be adjusted by the controller 50 in response to one or more of the operating states of the vehicle 16 or various accessories in communication with the controller 50. For example, as previously discussed, the controller 50 may selectively activate a privacy filter by controlling the privacy layer 60. The activation of the privacy filter may be controlled, for example, by activating the privacy layer 60 via a liquid crystal layer, electrochromic layer, or via additional electrically controlled transmission filters. In this configuration, the controller 50 may selectively adjust the activation of the privacy filter such that the viewing angle of the display light 32 is limited or blocked from being transmitted into the driver's side 40*a* of the passenger compartment 14 responsive to the vehicle 16 in a drive configuration (e.g., forward, reverse, etc.). Additionally, the controller 50 may deactivate the operation of the privacy layer 60 in response to the vehicle 16 in an operating or drive configuration that includes autonomous, semi-autonomous, or otherwise-assisted operation of the vehicle 16.

In order to facilitate the various features and operations discussed herein, the controller 50 may comprise a processor 108 having one or more circuits configured to receive the signals from the communication bus 106 and control the display panel 10. The processor 108 may be in communication with a memory 110 configured to store instructions to control operations of the display panel 10. In various implementations, the processor 108 may access various control instructions and routines to update and adjust the operation of the display panel 10, the camera 70, and the supplemental light sources 82, as well as any other accessories in communication with the controller 50. For example, the controller 50 may receive instructions from the user interface 80 to adjust the operation of any electronic systems or accessories of the vehicle 16 that may be communicatively connected.

The controller 50 may further be in communication with the camera 70, which may correspond to an interior camera or exterior camera of the vehicle. In such configurations, the controller 50 may selectively display the image data 74 depicting various portions of the passenger compartment 14 and/or the area surrounding the vehicle 16. The controller 50 may further be in communication with one or more of a gage cluster 114, an audio/video (A/V) system 116, an infotainment system 118, a media center, a vehicle computing system, and/or various other devices or systems of the vehicle. In such configurations, any data associated with these or similar sources of image data may be included in the display content 34 depicted on the display 24.

In some embodiments, the controller 50 may further be in communication with a mobile communication system 120. The mobile communication system 120 may be configured to communicate via various mobile communication protocols. Wireless communication protocols may operate in accordance with communication standards including, but not limited to: Institute of Electrical and Electronic Engineering (IEEE) 802.11 (e.g., Wi-Fi™); Bluetooth®; advanced mobile phone services (AMPS); digital AMPS; global system for mobile communications (GSM); code division multiple access (CDMA); Long Term Evolution (LTE or 4G LTE); local multi-point distribution systems (LMDS); multi-channel-multi-point distribution systems (MMDS); RFID; and/or variations thereof. In this configuration, the controller 50 may be configured to send an alert, message, instruction, data (e.g., image data, program, routine, etc.) to the controller 50 to control, update, or otherwise communication instructions to adjust the operation of the display panel 10. The alert or message may correspond to a text message, data message, email, alert via an application operating on a smart device, etc.

In additional examples, the controller 50 may be in communication with or configured to run one or more programs that may be associated with interconnected applications commonly associated with mobile phones. In such cases, the display content 34 output from the display 24 may be controlled via one or more applications or apps operating on the mobile phone or tablet and receive control instructions or image data to display on the display 24 as well as the corresponding control settings (e.g., transmittance, brightness, privacy filter activation, etc.) of the display panel 10 via instructions or data communicated via the mobile communication system 120. One example of content that may be demonstrated on the display panel 10 associated with a software application operating on a mobile device may include notifications, signage, messages or various content controlled via a ride-share or transportation application (e.g., Uber, Lyft, etc.) to communicate passenger information, logos, advertisements, videos, etc. In addition to the display content 34, the controller 50 may receive instructions to control the transmittance of the electro-optic element 22, the privacy layer 60, or any other accessories in communication therewith based on instructions received from an application to remotely control the operation of the display panel 10. In this way, the operation of the display panel may be controlled remotely via an application or internet-connected service and be conjunctively or alternatively controlled based on the operating state of the vehicle 16 as identified by the controller 50.

Additionally, alert information (e.g., emergency notifications, flashing illumination, etc.) may be output from the display panel 10. Additionally, or alternatively, the display content 34 and control settings of the display panel 10 may be manually entered into the mobile phone or device, such that a user selected or typed image or message may be processed by the controller 50 to be demonstrated on the display 24 via an application on the mobile device associated with the operation of the display panel 10. Additionally, user inputs into the mobile device may be received by the controller 50 via the communication system 120 to manually adjust the settings (e.g., transmittance, privacy, etc.) of the display panel 10.

The controller 50 may further be in communication with an ambient light sensor 122. The ambient light sensor 122 may be operable to communicate a light condition, for example a level of brightness or intensity of the ambient light proximate the vehicle. In response to the level of the ambient light, the controller 50 may be configured to adjust a light intensity output from the display 24. In this configuration, the operator of the controller may adjust the brightness of the display 24 and/or the supplemental lighting 82 to provide image data captured by the camera 70.

As previously discussed, the controller 50 may be in communication with the user interface 80 configured to receive one or more inputs configured to control at least one of the display panel 10 or various connected accessories discussed herein. In some embodiments, the user interface 80 may be combined with one or more devices of the vehicle. For example, the user interface 80 may form a portion of the gage cluster 114, the A/V system 116, the infotainment system 118, a display console, and/or various input/output devices that may commonly be utilized in automotive vehicles (e.g., a steering switch, steering wheel controls, etc.). In this way, the disclosure provides for various control schemes for implementing the display panel 10 in a vehicle.

In general, the electro-optic element 22 may correspond to various selectively transparent panels that may adjust a transmittance of light in response to one or more electrical signals. For example, the electro-optic element 22 may correspond to a liquid crystal element or electrochromic element. In various examples, the electrochromic element may comprise an electrochromic medium sealed between transparent substrates. The term "electrochromic" may define a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same;" U.S. Pat. No. 5,998,617 entitled "Electrochromic Compounds;" U.S. Pat. No. 6,020,987 entitled "Electrochromic Medium Capable Of Producing A Pre-Selected Color;" U.S. Pat. No. 6,037,471 entitled "Electrochromic Compounds;" U.S. Pat. No. 6,141,137 entitled "Electrochromic Media For Producing A Preselected Color;" U.S. Pat. No. 6,241,916 entitled "Electrochromic System;" U.S. Pat. No. 6,193,912 entitled "Near-Infrared-Absorbing Electrochromic Compounds And Devices Comprising Same;" U.S. Pat. No. 6,249,369 entitled "Coupled Electrochromic Compounds With Photostable Dication Oxidation States;" U.S. Pat. No. 6,137,620 entitled "Electrochromic Media With Concentration-Enhanced Stability, Process For The Preparation Thereof And Use In Electrochromic Devices;" U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," and PCT/EP98/03862 entitled "ELECTROCHROMIC POLYMER SYSTEM," which are herein incorporated by reference in their entirety.

According to some aspects of the disclosure, a display assembly for a vehicle comprises a variable transmittance panel in connection with a support structure connecting the display assembly to the vehicle. The variable transmittance panel comprises an electro-optic element configured to vary in transmittance in response to a transmittance control signal and a display that is at least partially light-transmissive and configured to output a display light, the display having opposing display surfaces on a first side and a second side, wherein the first side is disposed adjacent to the electro-optic element. At least one controller is configured to adjust the variable transmittance panel to a plurality of states comprising a first state and a second state, wherein the display light is output from only one of the first side and the second side in the first state, and the display light is output from both the first side and the second side in the second state.

According to various aspects, the disclosure may implement one or more of the following features or configurations in various combinations:

- the display assembly is least one of a visor, a privacy panel, or a sunshade positioned between a passenger compartment and an exterior window of the vehicle;
- the display assembly is selectively deployed proximate to a light transmitting surface of the exterior window, between the exterior window and the passenger compartment;
- in the first state, the a least one controller controls a transmittance of the electro-optic element to a darkened or opaque state and in the darkened or opaque state, the variable transmittance panel blocks environmental light entering a passenger compartment of the vehicle through an exterior window of the vehicle;
- in the first state, the a least one controller further controls the display light from the display to be output from the second side and blocked from transmission through the electro-optic element on the first side;

in the second state, the at least one controller controls the transmittance of the electro-optic element to a transmissive state and the display light is output from the first side and the second side;

the transmissive state of the electro-optic element transmits the display light from the second side and through the electro-optic element, such that the display light is transmitted into a passenger compartment of the vehicle, and the display light is transmitted from the second side through an exterior window of the vehicle;

the display light output from the second side is transmitted through the electro-optic element and through a windshield of the vehicle;

a camera in connection with the display assembly and configured to capture image data in a field of view directed into the passenger compartment;

the image data is displayed on the display in the first state, thereby providing a vanity display of a passenger in the field of view;

a camera in communication with the controller and located in the passenger compartment away from the display assembly, wherein the camera is configured to capture image data in a field of view directed into a rear passenger area of the passenger compartment;

the variable transmittance panel comprises a privacy filter adjacent to the second side of the display, wherein the privacy filter limits a display angle output from the first side of the display into the vehicle to a limited viewing angle;

the privacy filter comprises a liquid crystal structure that selectively activates a privacy setting of the display;

the limited viewing angle defines a viewing region in a passenger compartment of the vehicle that is directed to a passenger seat area and blocks transmission to a driver's seat area; and/or the electro-optic element is an electrochromic element.

According to another aspect of the disclosure, a method for controlling a variable transmittance panel comprises a display that is at least partially light transmissive and disposed proximate to an exterior window of a vehicle. The method further comprises controlling the variable transmittance panel in a first state by controlling the display to emit display light from a first side and a second side and controlling an electro-optic element to a darkened or opaque state and controlling the variable transmittance panel in a second state by controlling the display to emit display light from a first side and a second side and controlling an electro-optic element to a light transmissive state, where the light transmissive state outputs the display light from the first side through an exterior window of the vehicle and from the second side into a passenger compartment of the vehicle.

According to various aspects, the disclosure may implement one or more of the following features or configurations in various combinations:

the display light emitted from the first side of the display is blocked from being output from an exterior window of the vehicle by the darkened or opaque state of the electro-optic element;

controlling the variable transmittance panel to a third state, comprising deactivating the display light emitted from the display and controlling the electro-optic element to the light transmissive state, wherein environmental light incoming from the exterior window is transmitted through the display and the electro-optic element into the passenger compartment; and/or in the third state, the method further comprises adjusting a light transmission of the environmental light passing through the variable transmittance panel by selectively adjusting a transmittance of the electro-optic element.

It will be appreciated that embodiments of the invention described herein may be comprised of one or more conventional processors and unique stored program instructions that control one or more processors to implement, in conjunction with certain non-processor circuits, some, most, or all of the functions of the display panel 10, as described herein. Non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A display assembly for a vehicle comprising:

a variable transmittance panel in connection with a support structure connecting the display assembly to the vehicle, the variable transmittance panel comprising:

an electro-optic element configured to vary in transmittance in response to a transmittance control signal;

a display that is at least partially light-transmissive and configured to output a display light, the display having opposing display surfaces on a first side and a second side, wherein the first side is disposed adjacent to the electro-optic element; and at least one controller configured to adjust the variable transmittance panel to a plurality of states comprising a first state and a second state, wherein the display light is output from only one of the first side and the second side in the first state, and the display light is output from both the first side and the second side in the second state; and wherein in the first state, the at least one controller controls the transmittance of the electro-optic element to a darkened or opaque state and, in the darkened or opaque state, the variable transmittance panel blocks environmental light entering a passenger compartment of the vehicle through an exterior window of the vehicle, and wherein the at least one controller further controls the display light from the display to be output from the second side and blocked from transmission through the electro-optic element on the first side.

2. The display assembly according to claim 1, wherein the display assembly is at least one of a visor, a privacy panel, or a sunshade positioned between a passenger compartment and an exterior window of the vehicle.

3. The display assembly according to claim 2, wherein the display assembly is selectively deployed proximate to a light transmitting surface of the exterior window, between the exterior window and the passenger compartment.

4. The display assembly according to claim 1, wherein in the second state, the at least one controller controls the transmittance of the electro-optic element to a transmissive state and the display light is output from the first side and the second side.

5. The display assembly according to claim 4, wherein the transmissive state of the electro-optic element transmits the display light from the second side and through the electro-optic element, such that the display light is transmitted into a passenger compartment of the vehicle, and the display light is transmitted from the second side through an exterior window of the vehicle.

6. The display assembly according to claim 1, wherein the display light output from the second side is transmitted through the electro-optic element and through a windshield of the vehicle.

7. The display assembly according to claim 1, further comprising a camera in connection with the display assembly and configured to capture image data in a field of view directed into the passenger compartment.

8. The display assembly according to claim 7, wherein the image data is displayed on the display in the first state, thereby providing a vanity display of a passenger in the field of view.

9. The display assembly according to claim 1, further comprising a camera in communication with the controller and located in the passenger compartment away from the display assembly, wherein the camera is configured to capture image data in a field of view directed into a rear passenger area of the passenger compartment.

10. The display assembly according to claim 1, wherein the variable transmittance panel further comprises:

a privacy filter adjacent to the second side of the display, wherein the privacy filter limits a display angle output from the second side of the display into the vehicle to a limited viewing angle.

11. The display assembly according to claim 10, wherein the privacy filter comprises a liquid crystal structure that selectively activates a privacy setting of the display.

12. The display assembly according to claim 10, wherein the limited viewing angle defines a viewing region in a passenger compartment of the vehicle that is directed to a passenger seat area and blocks transmission to a driver's seat area.

13. The display assembly according to claim 1, wherein the electro-optic element is an electrochromic element.

14. A method for controlling a variable transmittance panel comprising a display that is at least partially light transmissive and disposed proximate to an exterior window of a vehicle, the method comprising:

controlling the variable transmittance panel in a first state by controlling the display to emit display light from a first side and a second side of the display and controlling an electro-optic element to a darkened or opaque state;

controlling the variable transmittance panel in a second state by controlling the display to emit display light from a first side and a second side of the display and controlling an electro-optic element to a light transmissive state, where the light transmissive state outputs the display light from the first side through an exterior window of the vehicle and from the second side into a passenger compartment of the vehicle; and controlling the variable transmittance panel to a third state, comprising deactivating the display light emitted from the display and controlling the electro-optic element to the light transmissive state, wherein environmental light incoming from the exterior window is transmitted through the display and the electro-optic element into the passenger compartment.

15. The method according to claim 14, wherein the display light emitted from the first side of the display is blocked from being output from an exterior window of the vehicle by the darkened or opaque state of the electro-optic element.

16. The method according to claim 14, wherein in the third state, the method further comprises:

adjusting a light transmission of the environmental light passing through the variable transmittance panel by selectively adjusting a transmittance of the electro-optic element.

17. A display assembly for a vehicle comprising:

a variable transmittance panel in connection with a support structure connecting the display assembly to the vehicle, the variable transmittance panel comprising:

an electro-optic element configured to vary in transmittance in response to a transmittance control signal; and a display that is at least partially light-transmissive and configured to output a display light, the display having opposing display surfaces on a first side and a second side, wherein the first side is disposed adjacent to the electro-optic element; and at least one controller configured to adjust the variable transmittance panel to a plurality of states comprising a first state, a second state, and a third state, wherein:

in the first state, the at least one controller controls a transmittance of the electro-optic element to a darkened or opaque state and in the darkened or opaque state, the display light from the display is output from the second side and blocked from transmission through the electro-optic element on the first side;

in the second state, the at least one controller controls the transmittance of the electro-optic element to a transmissive state and the display light is output from the first side and the second side, such that the display light is transmitted into a passenger compartment of the vehicle, and the display light is transmitted from the second side through an exterior window of the vehicle; and in the third state, the at least one controller controls the transmittance of the electro-optic element to the transmissive state and deactivates the display light output from the display, such that environmental light incoming from the exterior window is transmitted through the display and the electro-optic element into the passenger compartment.

18. The display assembly according to claim 1, wherein the controller is configured to control the variable transmittance panel adjusting an environmental light transmittance through the variable transmittance panel and a display light transmittance of display light output from the display.

* * * * *